United States Patent

Meyer et al.

(10) Patent No.: US 8,507,033 B2
(45) Date of Patent: Aug. 13, 2013

(54) SURFACE-MODIFIED, PYROGENICALLY PREPARED SILICAS

(75) Inventors: Juergen Meyer, Stockstadt (DE); Mario Scholz, Gruendau (DE); Kai Schumacher, Hofheim (DE)

(73) Assignee: Evonik Degussa GmbH, Essen (DE)

( * ) Notice: Subject to any disclaimer, the term of this patent is extended or adjusted under 35 U.S.C. 154(b) by 341 days.

(21) Appl. No.: 12/669,974

(22) PCT Filed: Jul. 1, 2008

(86) PCT No.: PCT/EP2008/058416
§ 371 (c)(1),
(2), (4) Date: Jan. 21, 2010

(87) PCT Pub. No.: WO2009/015969
PCT Pub. Date: Feb. 5, 2009

(65) Prior Publication Data
US 2010/0233059 A1    Sep. 16, 2010

(30) Foreign Application Priority Data
Jul. 30, 2007   (DE) .................. 10 2007 035 955

(51) Int. Cl.
| | |
|---|---|
| *B05D 7/00* | (2006.01) |
| *C01B 33/12* | (2006.01) |
| *B32B 5/16* | (2006.01) |
| *B32B 9/00* | (2006.01) |
| *B32B 15/02* | (2006.01) |
| *B32B 17/02* | (2006.01) |
| *B32B 19/00* | (2006.01) |
| *B32B 21/02* | (2006.01) |
| *B32B 23/02* | (2006.01) |
| *B32B 27/02* | (2006.01) |

(52) U.S. Cl.
USPC ............ 427/219; 423/335; 423/337; 428/405

(58) Field of Classification Search
USPC ......... 428/402–407; 423/335–340; 427/219, 427/220
See application file for complete search history.

(56) References Cited

U.S. PATENT DOCUMENTS

| | | | | |
|---|---|---|---|---|
| 5,429,873 | A * | 7/1995 | Deusser et al. ............... | 428/405 |
| 5,900,315 | A | 5/1999 | Little | |
| 5,989,768 | A | 11/1999 | Little | |
| 6,887,518 | B2 * | 5/2005 | Barthel et al. ................ | 427/219 |
| 2002/0168524 | A1 * | 11/2002 | Kerner et al. ................. | 428/405 |
| 2003/0138715 | A1 | 7/2003 | Barthel et al. | |
| 2004/0120876 | A1 * | 6/2004 | Meyer et al. .................. | 423/335 |
| 2004/0131527 | A1 | 7/2004 | Gottschalk-Gaudig et al. | |
| 2005/0241531 | A1 | 11/2005 | Meyer et al. | |
| 2006/0155042 | A1 * | 7/2006 | Schumacher et al. ........ | 524/493 |
| 2009/0311159 | A1 * | 12/2009 | Gray ............................. | 423/335 |

FOREIGN PATENT DOCUMENTS

| | | |
|---|---|---|
| CN | 1803603 A | 7/2006 |
| EP | 1 304 332 | 4/2003 |
| EP | 1 304 361 | 4/2003 |
| EP | 1 431 245 | 6/2004 |
| EP | 1 681 266 | 7/2006 |

OTHER PUBLICATIONS

Office Action issued Jun. 25, 2012 in Chinese Patent Application No. 200880025325.8 (with English translation).

\* cited by examiner

*Primary Examiner* — Colleen Dunn
*Assistant Examiner* — Anthony J Zimmer
(74) *Attorney, Agent, or Firm* — Oblon, Spivak, McClelland, Maier & Neustadt, L.L.P.

(57) ABSTRACT

Surface-modified, pyrogenically prepared silica is prepared by subjecting the pyrogenically prepared silica, which is in the form of aggregates of primary particles and possesses a BET surface area of 150±15 m²/g, the aggregates having an average area of 12 000-20 000 nm², an average equivalent circle diameter (ECD) of 90-120 nm and an average circumference of 1150-1700 nm, to surface-modification in a known way. It can be used as a filler for thickening liquid systems.

9 Claims, No Drawings

SURFACE-MODIFIED, PYROGENICALLY PREPARED SILICAS

The invention relates to surface-modified, pyrogenically prepared silicas, to a process for preparing them and to their use.

The preparation of surface-modified pyrogenic (fumed) silicas from pyrogenically prepared silicas by surface modification is known. Silicas prepared in this way find use in many fields of application: for example, for controlling the rheology of liquid systems, in resins, and for use in adhesives. In these applications, great importance attaches not only to the thickening effect but also to the ease of incorporation into the liquid system.

The known surface-modified, pyrogenic silicas have the disadvantage that their ease of incorporation into liquid systems is unsatisfactory.

The object was therefore to prepare surface-modified pyrogenic silicas which possess an improved ease of incorporation into liquid systems without detriment to other important properties, such as the thickening effect.

The invention provides surface-modified, pyrogenically prepared silicas which are characterized in that their ease of incorporation into liquid systems is improved without detriment to the thickening effect.

The invention further provides a process for preparing the surface-modified, pyrogenically prepared silica, which is characterized in that the pyrogenically prepared silica, which is in the form of aggregates of primary particles and possesses a BET surface area of $150 \pm 15$ m$^2$/g, the aggregates having an average area of 12 000-20 000 nm$^2$, an average equivalent circle diameter (ECD) of 90-120 nm and an average circumference of 1150-1700 nm, is surface-modified in a known way.

The pyrogenically prepared silica used as starting material is known from EP 1 681 266 A2.

The surface modification can be accomplished by spraying the silicas where appropriate with water and subsequently with the surface modifier. Spraying may also take place in the opposite order. The water used may have been acidified with an acid, hydrochloric acid, for example, to a pH of 7 to 1. If two or more surface modifiers are employed, they can be applied together, or separately, in succession or as a mixture.

The surface modifier or modifiers may have been dissolved in suitable solvents. The end of spraying may be followed by mixing for 5 to 30 minutes more.

The mixture is subsequently treated thermally at a temperature of 20 to 400° C. over a period of 0.1 to 6 h. The thermal treatment may take place under inert gas, such as nitrogen, for example.

An alternative method of surface modification of the silicas can be accomplished by treating the silicas with the surface modifier in vapour form and then thermally treating the mixture at a temperature of 50 to 800° C. over a period of 0.1 to 6 h. The thermal treatment may take place under inert gas, such as nitrogen, for example.

The temperature treatment may also take place over a number of stages at different temperatures.

The surface modifier or modifiers can be applied using single-fluid, two-fluid or ultrasound nozzles.

The surface modification can be carried out in heatable mixers and dryers with spraying installations, continuously or batchwise. Suitable apparatus may for example be the following: ploughshare mixers, plate dryers, fluidized-bed dryers or fluid-bed dryers.

As surface modifier it is possible to use at least one compound from the group of the following compounds:

a) organosilanes of type $(RO)_3Si(C_nH_{2n+1})$ and $(RO)_3Si(C_nH_{2n-1})$
  R=alkyl, such as for example, methyl-, ethyl-, n-propyl-, isopropyl-, butyl-
  n=1-20 b) organosilanes of type $R'_x(RO)_ySi(C_nH_{2n+1})$ and $R'_x(RO)_ySi(C_nH_{2n-1})$
  R=alkyl, such as for example, methyl-, ethyl-, n-propyl-, isopropyl-, butyl-
  R'=alkyl, such as for example, methyl-, ethyl-, n-propyl-, isopropyl-, butyl-
  R'=cycloalkyl
  n=1-20
  x+y=3
  x=1, 2
  y=1, 2 c) haloorganosilanes of type $X_3Si(C_nH_{2n+1})$ and $X_3Si(C_nH_{2n-1})$
  X=Cl, Br
  n=1-20 d) haloorganosilanes of type $X_2(R')Si(C_nH_{2n+1})$ and $X_2(R')Si(C_nH_{2n-1})$
  X=Cl, Br
  R'=alkyl, such as for example, methyl-, ethyl-, n-propyl-, isopropyl-, butyl-
  R'=cycloalkyl
  n=1-20 e) haloorganosilanes of type $X(R')_2Si(C_nH_{2n+1})$ and $X(R')_2Si(C_nH_{2n-1})$
  X=Cl, Br
  R'=alkyl, such as for example, methyl-, ethyl-, n-propyl-, isopropyl-, butyl-
  R'=cycloalkyl
  n=1-20 f) organosilanes of type $(RO)_3Si(CH_2)_m$—R'
  R=alkyl, such as methyl-, ethyl-, propyl-
  m=0.1-20
  R' methyl-, aryl (for example —$C_6H_5$, substituted phenyl radicals)
  —$C_4F_9$, —$OCF_2$—CHF—$CF_3$, —$C_6F_{13}$, —O—$CF_2$—$CHF_2$
  —$NH_2$, —$N_3$, —SCN, —CH=$CH_2$, —NH—$CH_2$—$CH_2$—$NH_2$,
  —N—($CH_2$—$CH_2$—$NH_2$)$_2$
  —OOC($CH_3$)C=$CH_2$
  —$OCH_2$—CH(O)$CH_2$
  —NH—CO—N—CO—($CH_2$)$_5$
  —NH—COO—$CH_3$, —NH—COO—$CH_2$—$CH_3$,
  —NH—($CH_2$)$_3$Si (OR)$_3$
  —$S_x$—($CH_2$)$_3$Si(OR)$_3$
  —SH
  —NR'R''R'''(R'=alkyl, aryl; R''=H, alkyl, aryl; R'''=H, alkyl, aryl, benzyl, $C_2H_4$NR''''R''''' with R''''=H, alkyl and R'''''=H, alkyl)

g) organosilanes of type $(R'')_x(RO)_ySi(CH_2)_m$—R'

$$R'' = \text{alkyl} \quad x+y=3$$
$$= \text{cycloalkyl} \quad x=1, 2$$
$$y=1, 2$$
$$m=0.1 \text{ to } 20$$

R'=methyl-, aryl (for example —$C_6H_5$, substituted phenyl radicals)
  —$C_4F_9$, —$OCF_2$—CHF—$CF_3$, —$C_6F_{13}$, —O—$CF_2$—$CHF_2$ —NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$,   —NH—COO—CH$_2$—CH$_3$,
—NH—(CH$_2$)$_3$Si (OR)$_3$
—S$_x$—(CH$_2$)$_3$Si (OR)$_3$
—SH
—NR'R"R'"(R'=alkyl, aryl; R"=H, alkyl, aryl; R'"=H, alkyl, aryl, benzyl, C$_2$H$_4$NR""R'" with R""=H, alkyl and R'""=H, alkyl)

h) haloorganosilanes of type X$_3$Si(CH$_2$)$_m$—R'
X=Cl, Br
m=0.1-20
R'=methyl-, aryl (for example —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$,
—NH—CH$_2$—CH$_2$—NH$_2$
—N—(CH$_2$—CH$_2$—NH$_2$)$_2$
—OOC(CH$_3$)C=CH$_2$
—OCH$_2$—CH(O)CH$_2$
—NH—CO—N—CO— (CH$_2$)$_5$
—NH—COO—CH$_3$,   —NH—COO—CH$_2$—CH$_3$,
—NH—(CH$_2$)$_3$Si (OR)$_3$
—S$_x$—(CH$_2$)$_3$Si (OR)$_3$
—SH i) haloorganosilanes of type (R)X$_2$Si(CH$_2$)$_m$—R'
X=Cl, Br
R=alkyl, such as methyl-, ethyl-, propyl-
m=0.1-20
R=methyl-, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$—NH—COO—CH$_3$,
—NH—COO—CH$_2$—CH$_3$, —NH—(CH$_2$)$_3$Si(OR)$_3$, it being possible for R to be methyl-, ethyl-, propyl-, butyl-
—S$_x$—(CH$_2$)$_3$Si(OR)$_3$, it being possible for R to be methyl-, ethyl-, propyl-, butyl-
—SH J) haloorganosilanes of type (R)$_2$XSi(CH$_2$)$_m$—R'
X=Cl, Br
R=alkyl
m=0.1-20
R'=methyl-, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO— (CH$_2$)$_5$
—NH—COO—CH$_3$,   —NH—COO—CH$_2$—CH$_3$,
—NH—(CH$_2$)$_3$Si (OR)$_3$
—S$_x$—(CH$_2$)$_3$Si (OR)$_3$
—SH k) silazanes of type

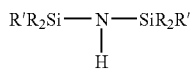

R=alkyl, vinyl, aryl
R'=alkyl, vinyl, aryl l) cyclic polysiloxanes of type D 3, D 4, D 5, with D 3, D 4 and D 5 meaning cyclic polysiloxanes having 3, 4 or 5 units of type —O—Si(CH$_3$)$_2$—.
e.g. octamethylcyclotetrasiloxane=D 4

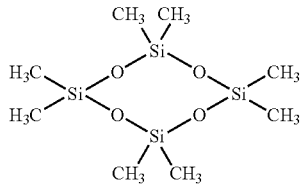

m) polysiloxanes or silicone oils of type

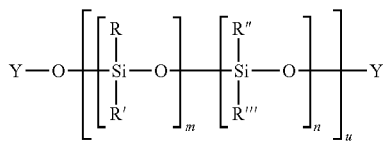

m = 0, 1, 2, 3, ... ∞
n = 0, 1, 2, 3, ... ∞
u = 0, 1, 2, 3, ... ∞
Y = CH$_3$, H, C$_n$H$_{2n+1}$ n = 1-20
Y = Si(CH$_3$)$_3$, Si(CH$_3$)$_2$H
Si(CH$_3$)$_2$OH, Si(CH$_3$)$_2$(OCH$_3$)
Si(CH$_3$)$_2$(C$_n$H$_{2n+1}$) n = 1-20

R=alkyl such as C$_n$H$_{2n+1}$, n being 1 to 20, aryl, such as phenyl radicals and substituted phenyl radicals, (CH$_2$)$_n$—NH$_2$, H
R'=alkyl such as C$_n$H$_{2n+1}$, n being 1 to 20, aryl, such as phenyl radicals and substituted phenyl radicals, (CH$_2$)$_n$—NH$_2$, H
R"=alkyl such as C$_n$H$_{2n+1}$, n being 1 to 20, aryl, such as phenyl radicals and substituted phenyl radicals, (CH$_2$)$_n$—NH$_2$, H
R'"=alkyl such as C$_n$H$_{2n+1}$, n being 1 to 20, aryl, such as phenyl radicals and substituted phenyl radicals, (CH$_2$)$_n$—NH$_2$, H As surface modifiers it is preferred to use the following silanes:
octyltrimethoxysilane, octyltriethoxysilane, hexamethyldisilazane, 3-methacryloyloxypropyltrimethoxysilane, 3-methacryloyloxypropyltriethoxysilane, hexadecyltrimethoxysilane, hexadecyltriethoxysilane, dimethylpolysiloxane, glycidyloxypropyltrimethoxysilane, glycidyloxypropyltriethoxysilane, nonafluorohexyltrimethoxysilane, tridecafluorooctyltrimethoxysilane, tridecafluorooctyltriethoxysilane, aminopropyltriethoxysilane, hexamethyldisilazane and polydimethylsiloxane.

With particular preference it is possible to use hexamethyldisilazane, dimethylpolysiloxane, octyltrimethoxysilane, octyltriethoxysilane and polydimethylsiloxane More particularly it is possible to use polydimethylsiloxane.

The surface-modified, pyrogenically prepared silica of the invention can be used as a filler for resins.

The invention further provides resins which comprise the surface-modified, pyrogenically prepared silica of the invention.

The invention features the following advantages: greater ease of incorporation into liquid systems without detriment to the thickening effect.

EXAMPLES

Preparation of the Comparative Silica 2 kg of silica 11 (Table 4 from EP 1681266) were charged to a mixer and, with mixing, were sprayed with 0.42 kg of Rhodorsil oil 47 V 100 (polydimethylsiloxane) by means of a two-fluid nozzle. After the end of spraying, mixing was continued for 15 minutes and the reaction mixture was subsequently heated under a nitrogen atmosphere.

Preparation of the Inventive Silicas

Example 2 kg of silica 1 (Table 4 from EP 1 681266) were charged to a mixer and, with mixing, were sprayed with 0.42 kg of Rhodorsil oil 47 V 100 (polydimethylsiloxane) by means of a two-fluid nozzle. After the end of spraying, mixing was continued for 15 minutes, and the reaction mixture was subsequently heated under a nitrogen atmosphere.

Physicochemical Data

| Designation | Tapped density [g/l] | Loss on drying [%] | Loss on ignition [%] | pH | C content [%] | BET specific surface area [m$^2$/g] |
|---|---|---|---|---|---|---|
| Comparative silica | 67 | 0.1 | 4.4 | 5.8 | 4.6 | 95 |
| Inventive silica | 65 | 0.1 | 4.4 | 5.7 | 4.6 | 94 |

Determination of Incorporation Characteristics

The incorporation characteristics were determined by measuring the time required for the silica to be homogenized in a resin.

This is done by weighing out 100 g of Palatal A 410 into a 350 ml beaker and heating it at 25° C. in a water bath.

The beaker is introduced into the aluminium insert of the mounting device of the dissolver (Getzmann Dispermat).

The stirrer (disc diameter 30 mm) is immersed to its target depth of t=10 mm above the base of the beaker, and switched on at a speed n of 500 min$^{-1}$.

3 g of silica are placed uniformly onto the surface of the resin, and the stopwatch is started.

A measurement is made of the time required for the silica to be homogenized.

The elapsed time is translated into a school-grade system (grade 1-grade 5). Grade 1 corresponds to very good (rapid) incorporation. Grade 5 corresponds to very poor (slow) incorporation.

Determination of Thickening Effect in an Epoxy Resin 201.92 g (92.15%) of Renalm M1 and 8.08 g (3.85%) of silica are weighed out into a 350 ml PE beaker.

The dissolver disc (disc diameter: d=50 mm) is immersed to the middle point of the beaker and the sample is homogenized at 1000 rpm.

In this case the beaker is sealed with the perforated lid in order to prevent the silica escaping as dust.

As soon as the silica has been fully incorporated, the disc is immersed to a depth of 10 mm above the base of the beaker.

Dispersion is carried out for 3 minutes at a speed of 3000 rpm. During this time, air is removed under vacuum.

The dispersed sample is transferred to a 250 ml glass bottle. The sample is stored in a water bath at 25° C. for 90 minutes.

After 90 minutes the sample is agitated with a spatula for 1 minute. Subsequently the viscosity of the sample is determined using a Brookfield DV III.

For this purpose the spindle of the Brookfield rheometer is immersed to the defined mark. Measurement is carried out as follows:

5 rpm—value read off after 60 seconds
50 rpm—value read off after 30 seconds.

The values read off are the viscosities [Pa*s] at the respective rpm.

Incorporation Characteristics and Thickening Effect—Results

| Designation | Incorporation (grade) | Thickening at 5 rpm [Pa*s] | Thickening at 50 rpm [Pa*s] |
|---|---|---|---|
| Comparative silica | 4 | 70 000 | 15 760 |
| Inventive silica | 1 | 70 600 | 15 360 |

It is clearly apparent that the inventive silica exhibits much better incorporation characteristics. This means that it is incorporated more rapidly than the comparative silica, despite the fact that not only the thickening effect but also the other physico-chemical data are comparable.

The invention claimed is:

1. A process for preparing a silica for incorporation into a resin, the method comprising:
    pyrogenically preparing a silica powder;
    applying at least one dimethylpolysiloxane surface modifier to the pyrogenic silica powder; and
    heat treating the silica powder with the applied surface modifier to obtain the silica for incorporation into a resin;
    wherein
    the pyrogenically prepared silica powder comprises aggregates of primary particles,
    a BET surface area of the aggregates is 150±15 m$^2$/g,
    an average area of the aggregates is from 12 000 to 20 000 nm$^2$,
    an average equivalent circle diameter (ECD) of the aggregates is from 90 to 120 nm, and
    an average circumference of the aggregates is from 1150 to 1700 nm.

2. The process of claim 1, wherein the application of the at least one dimethylpolysiloxane surface modifier comprises spraying the silica with the at least one dimethylpolysiloxane surface modifier.

3. The process of claim 1, wherein the application of the at least one dimethylpolysiloxane surface modifier comprises:
    treating the silica with the at least one dimethylpolysiloxane surface modifier in vapor form to obtain a mixture, and subsequently
    thermally treating the mixture at a temperature of 50 to 800° C. over a period of 0.1 to 6h.

4. The process of claim 2, wherein the surface modification comprises spraying the silica with water prior to spraying the silica with the at least one dimethylpolysiloxane surface modifier.

5. The process of claim 2, wherein the surface modification comprises spraying the silica with water after spraying the silica with the at least one dimethylpolysiloxane surface modifier.

6. The process of claim 4, wherein the water comprises an acid.

7. The process of claim 5, wherein the water comprises an acid.

8. The process of claim 1, wherein the surface modifier consists essentially of polydimethylsiloxane.

9. The process of claim 1, wherein the surface modifier consists of polydimethylsiloxane.

* * * * *